Jan. 12, 1960  S. D. MOXLEY  2,921,294
MAGNETIC DATA READ-OUT DEVICE AND METHOD
Filed July 5, 1956  2 Sheets-Sheet 1

INVENTOR.
STEVE D. MOXLEY
BY *Jerry J. Dunlap*
ATTORNEY

United States Patent Office 2,921,294
Patented Jan. 12, 1960

2,921,294

MAGNETIC DATA READ-OUT DEVICE AND METHOD

Steve D. Moxley, Ponca City, Okla., assignor to Continental Oil Company, Ponca City, Okla., a corporation of Delaware Application July 5, 1956, Serial No. 595,962

14 Claims. (Cl. 340—174)

This invention relates to a method of and apparatus for recording the discrete values of a quantity which is a function of a variable, wherein the discrete values of the quantity correspond to a set of known values of the variable.

In many instances, values of a changing quantity are only available at spaced intervals of the variable, as for example, the daily value of a share on the stock exchange wherein the quantity is a function of time defined only at daily intervals. Another common occurrence is found in the computing field when a quantity is derived by a lengthy computational process performed for a set of values of the independent variable and the magnitude of said quantity as a function of the independent variable is desired to be stored for later use.

There are various well known methods of recording such quantities, such as the spot magnetization method wherein the intensity of magnetization of spaced spots along a magnetic medium are indicative of the magnitude of the quantity to be recorded, while the position of the spot is indicative of the corresponding value of the independent variable. Another commonly used method of storage of such quantities is by digitizing the quantity to be stored and spot magnetizing the resulting digits on magnetic material at predetermined locations related to the value of the independent variable. This last method is the one used in the digital computer field.

These prior methods have a number of disadvantages. The spot magnetization method has a very low signal-to-noise ratio due to the small proportion of the magnetizing medium which actually carries information. The digitized method is complex and expensive since it requires first an analog-to-digital conversion.

I have discovered a new method of and apparatus for recording such quantities which eliminates the above-mentioned disadvantages.

One object of my invention is to provide a method of recording discrete values of a quantity which changes as a function of an independent variable, which method does not require the digitization of the quantity and still is characterized by a much higher signal-to-noise ratio than the spot magnetization method.

Another object of my invention is to provide a new method of and apparatus for recording on a magnetic medium discrete values of a quantity which is a continuous function of an independent variable, whereby the continuous variations of the quantity may be derived therefrom with great accuracy and simplicity.

A further object of my invention is to provide a new method of and apparatus for forming a continuous signal varying with time which is representative of a quantity function of an independent variable, wherein the values of said quantity are only available at discrete intervals of the independent variable.

My invention provides also an improved and novel method of and apparatus for transposing a series of time-spaced electrical signals representing the values of a quantity which is a continuous electrical signal representative of this function by use of a magnetic recording medium.

The novel features which are believed to be characteristic of the invention, together with further objects and advantages thereof, will be better understood from the following description considered in connection with the accompanying drawings. It is expressly understood, however, that the drawings are for the purpose of illustration and description only, and are not intended as a definition of the limits of the invention.

Figure 1:
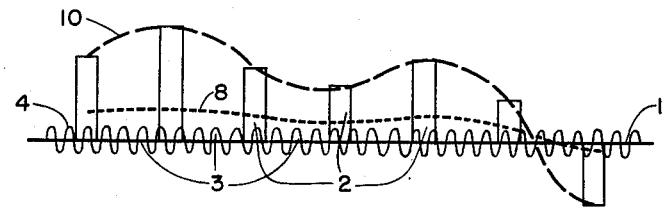
Figure 1 is a diagrammatic representation of a well known method of recording discrete time-spaced signals.

Broadly stated, my invention relates to a new method of and apparatus for recording discrete values of a quantity which is a function of a variable, wherein the discrete values of said quantity correspond to known values of said variable, comprising magnetizing successive zones of a recording medium, which zones represent said discrete values, the degree of magnetization of each zone being uniform within itself and having a predetermined relation to the respective discrete value, spacing corresponding points of such zones at a predetermined relation with respect to said values of the variable and spacing said successive zones at a distance therebetween less than one-half the length of either of the zones adjacent thereto.

Magnetic recording of continuous time-varying signals is a well perfected technique. However, little prior art exists when the signal to be stored is available at spaced time intervals only, and when a permanent storage of the amplitude of these individual signals is desired, as for instance, to allow later reproduction of a sequence of these discrete signals as a continuous time-varying signal.

In the past, discrete time-spaced signals have been recorded by the spot magnetization technique in which the magnetic record is impressed on the magnetic medium so as to produce individual and segregated spots whose intensity of magnetization bears a relation to the amplitude of the signal to be recorded. The recording medium is then moved with respect to the magnetic recording means between the time-spaced signal impressions. This technique, which is similar to the magnetic storage method utilized in digital computers wherein the amplitude of the stored signal is constant and is not indicative of the stored data, presents many shortcomings, in particular with respect to the low signal-to-noise ratio which it provides.

This invention on the contrary provides a very high signal-to-noise ratio. It contemplates a new and improved method of recording on a magnetic medium discrete, time-spaced signals of variable amplitude in such a manner as to magnetize a larger portion of the length of the recording medium improving thereby the signal-to-noise ratio.

In one preferred embodiment of my invention, the medium is moved along a predetermined length while the recording means are impressing the original signal at a constant value representing the magnitude of the discrete quantity to be recorded. The next discrete value is recorded in a similar fashion on an equal length of the recording medium spaced from the preceding length by a distance therebetween less than one-half of said lengths.

In another embodiment, the magnetization of the recording medium for lengths substantially larger than the intervals therebetween is obtained by use of a wide gap recording head. The recording medium is then impressed along a substantial length without displacement of the medium during each of the magnetization periods. Between these magnetization periods, the recording medium is indexed by a distance which is equal to, or slightly larger than, the width of the head gap.

My invention further contemplates the reproduction of said stored originally time-spaced discrete signals as a continuous time-varying signal, as will be described later.

Referring now to Figure 1, the horizontal line 1 represents a section of a magnetic recording medium, such as a tape or wire, and the vertical ordinate is indicative of the intensity of magnetization of said magnetic medium when the so-called "spot magnetization technique" is used. In this prior technique, the discrete time-spaced signals of varying amplitude are impressed on the recording medium at widely spaced narrow spots 2. The recording medium 1 is kept immobile during each magnetization period and it is moved (indexed) between successive magnetizations by an interval 3 which is large relative to the length of the discrete spots. The intensity of magnetization of each spot 2 is proportional to the discrete signal amplitude.

The recording medium is never perfect, and it has inherent magnetic intensity variations due mainly to random inhomogeneity of the constituting material. The level of these magnetic intensity variations is indicated by the ragged line 4. When the originally stored signal is reproduced by playback at a higher speed and smoothed, the magnetic energy stored in the spots 2 is distributed over the intervals 3 between the spots, and the level of this reproduced signal is very low if the spot width is small compared to the interval between the spots as indicated in Figure 1. When this low level is comparable to the level of the magnetic intensity variations indicated by line 4, the signal becomes buried into the noise and cannot be recognized.

The signal-to-noise ratio of a magnetic recording system is usually defined as the ratio of the amplitude of the largest signal the system can reproduce without distortion to the amplitude of the background noise of the system. In the spot magnetization technique, the amplitude of the largest signal which can be reproduced without distortion is determined by the saturation effect on the magnetic medium. This depends only upon the characteristics of the medium, and, therefore, the signal-to-noise ratio obtainable with the spot magnetization technique is very low since the magnetized spots occupy a small portion of the length of the recording medium.

On the contrary, a high value of the signal-to-noise ratio is obtainable with my improved method of magnetic recording. This may be best understood by having reference to Figure 2 which is again a plot of the intensity of magnetization as a function of one linear dimension of the recording medium. The horizontal line 5 represents a section of a magnetic recording medium such as a tape or wire, and the vertical ordinate is again indicative of the variations of the intensity of magnetization of the medium along this linear dimension. An examination of Figure 2 indicates that, while the magnetized intervals 6 have an intensity of magnetization proportional to the value of the discrete signals to be recorded, their lengths are increased so that they are larger than the remaining non-magnetized intervals 7 left therebetween.

Figure 2:
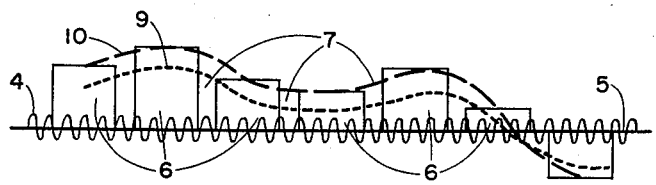
Figure 2 is a diagrammatic representation of the new method of recording discrete time-spaced signals according to my invention.

I have found that this is required in order to obtain an acceptable signal-to-noise ratio. If one compares the signal-to-noise ratios corresponding to the two recording schemes indicated by Figure 1 and Figure 2, it is clear that (the amplitude of the maximum signal which can be stored on the recording medium being assumed the same) the signal-to-noise ratio improvement is equal to the ratio of the average signal level in the two systems. These average signal levels are indicated in Figures 1 and 2 by the curves 8 and 9 respectively. Curve 4 in Figure 2 is again indicative of the noise level of the recording medium, and is assumed to be the same as in Figure 1. Curve 10 in both Figures 1 and 2 is representative of the variations of a quantity which is a continuous function of a variable, only discrete values of which are available for a set of known values of the variable. These values of the variable are indicated by the location of the center of the magnetized intervals along the length of the recording medium.

Inspection of Figures 1 and 2 show that the average level of the signal along the recording medium is a function of the lengths of the magnetized and non-magnetized intervals. When the discrete signals have been recorded as shown in Figure 1 and later, during reproduction, are integrated for smoothing purposes, the average level of the signal is reduced, the shorter the magnetized portions in proportion to the non-magnetized portions of the recording medium, as indicated by the curves 8 and 9. If the recording system introduces a constant noise level, assumed equal in both methods, it is clear that the continuous time varying signal reproduced by the old method will be much closer to the noise level than the same signal reproduced by my improved method.

I have found that an acceptable signal-to-noise ratio may be obtained without having to magnetize the medium to saturation, and therefore without distortion, if the magnetized lengths are at least as long as the lengths of the non-magnetized intervals. When a series of discrete time-spaced signals are recorded in this fashion, the level of the signal, when reproduced as a continuous time varying function, is at most reduced by half and remains above the noise level even for small signal amplitude.

The magnetization of the medium for lengths substantially larger than the intervals therebetween may be accomplished in various ways.

Figure 3:
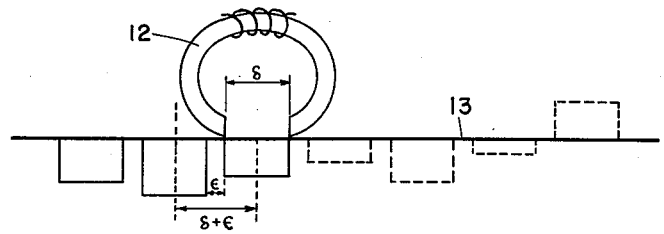
Figure 3 is a schematic representation of a recording system embodying the invention.

In Figure 3 I have schematically represented one system for accomplishing the magnetization. This system involves placing a wide gap recording head 12 in juxtaposition to a recording medium 13. There is no relative movement between the head 12 and the medium 13 while an electrical signal (representing one discrete value of the variable quantity being recorded) is applied to the winding of the head. The medium is magnetized over a length $\delta$ approximately equal to the head gap, and the intensity of magnetization is proportional to the signal amplitude. During the time intervals between the discrete time-spaced values of the quantity being recorded, the recording medium and the head are moved with respect to one another by a distance which is shorter than twice the head gap. In general, the discrete values of the variable quantity correspond to equispaced values of the independent variable and therefore the magnetized portions are also equispaced. In this case, the recording medium is indexed by a predetermined distance $\delta + \epsilon$ between recording periods; said distance preferably being between one and one and a half the length of the head gap, that is, $$0 \leq \epsilon \leq \frac{\delta}{2}$$

Figure 4:
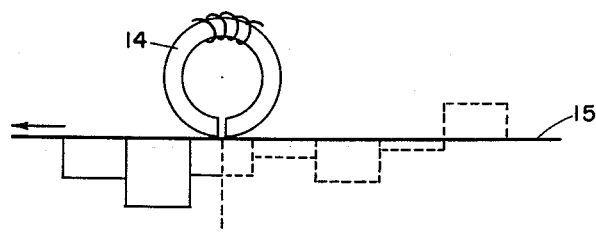
Figure 4 is a schematic representation of another recording system embodying the invention.

Another preferred method of magnetizing the recording medium for lengths substantially larger than the intervals therebetween is indicated in Figure 4. A narrow gap recording head 14 is placed in juxtaposition to a recording medium 15 and the medium is displaced longitudinally under the recording head while each discrete signal (representing one value of the variable quantity being recorded) is applied to the recording head. The length of the displacement of the recording medium 15 during each discrete magnetization period is substantially larger than the head gap, and the successive magnetized zones may be immediately following each other or separated by a distance which must be smaller than half the length of the said zones. Obviously, the recording head 14 may be displaced with respect to the recording medium 15 and the same result obtained, since it is the relative displacement of the two with respect to each other which determines the length of the discrete magnetized zones. During the magnetization period, the current circulating through the winding of the magnetic head is held constant at a value representative of the magnitude and sign of the quantity to be recorded. The position of the midpoint of each zone is determined by a known relation between it and the values of the independent variable for which the magnitude of the quantity to be recorded is supplied. In general, these valves are at fixed intervals, and the relation is a linear correspondence, so that the zones are also equispaced and may be immediately adjacent. The length of the zone is determined by the signal-to-noise ratio which is required.

My invention is extremely useful when it is desired to record discrete discontinuous signals available at time-spaced intervals in such a way that they may be reproduced by playback as a continuous time-varying signal. By use of the recording method which has been described, it is possible to form a continuous signal representing a quantity which is a function of a variable from discrete values of the quantity corresponding to known values of the variable. Therefore, it may be properly called also a method of transposing a series of time-spaced signals to a continuous time-varying signal or a method of forming a continuous trace representing a quantity which varies with time from time-spaced substantially instantaneous values of such quantity.

This problem occurs frequently when a quantity is sampled at regular or variable time-spaced intervals, or when a quantity is derived from a computation and appears in electrical form at the end of the computation process, as is the case with analog computers. Therefore, my invention is particularly useful as a data read-out process and apparatus used in connection with sampling or computing devices.

As an example, the invention will now be described as used with a multichannel data processing machine from which, at consecutive intervals, data in the form of discrete electrical signals are available; these signals being either control signals per se, or representing specific amplitudes of some other variable, as in analog computing.

Figure 5:
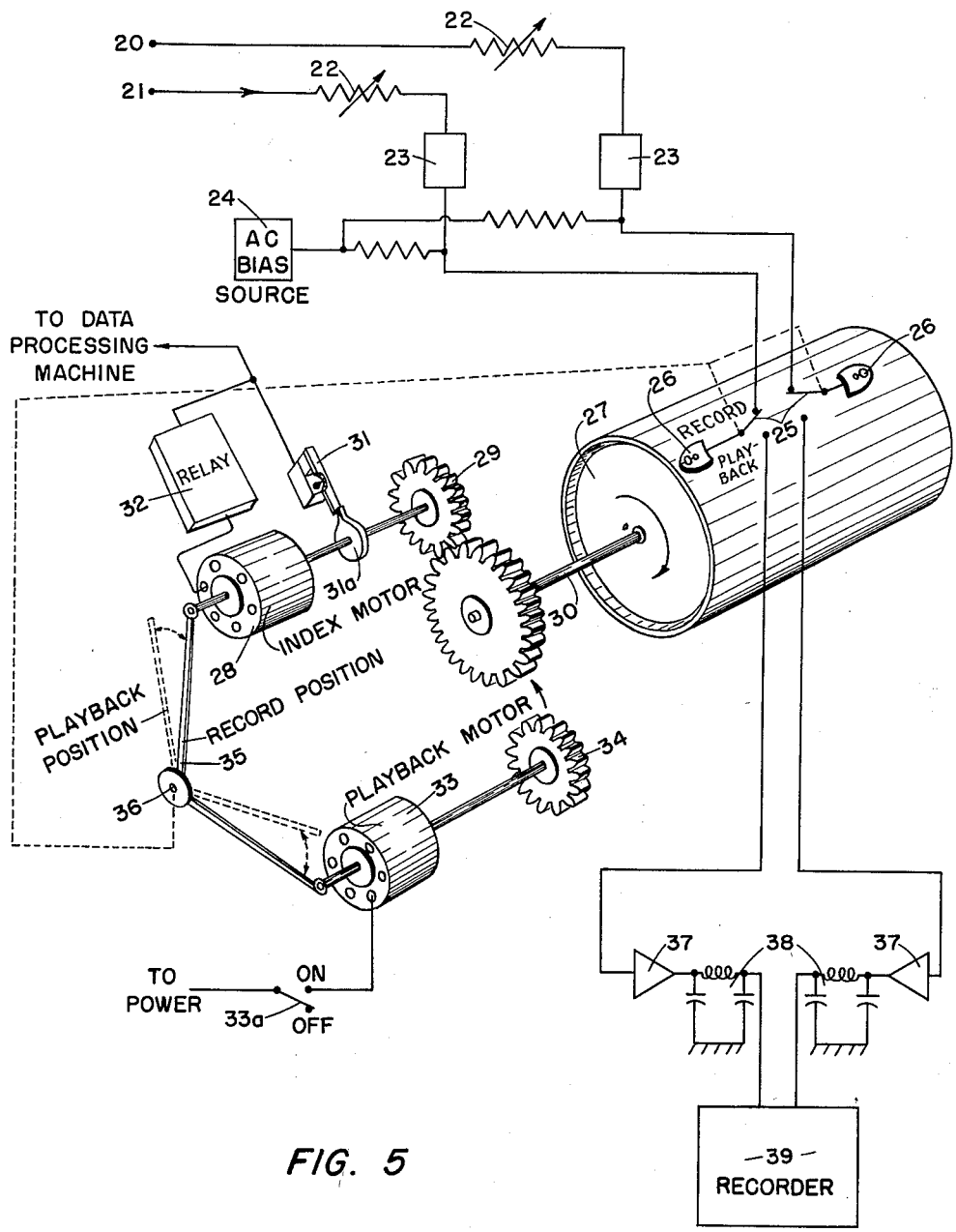
Figure 5 is a schematic representation of an apparatus embodying the invention which may be used for transposing discrete time-spaced signals of varying amplitudes into a continuous time-varying signal.

In Figure 5 there is shown, schematically, a two-channel data read-out device embodying the invention. Only two channels have been indicated for the sake of clarity, but in practice any number of channels may be used. The discrete signals provided by the sampler, analog computer or other data processing device (not shown) used in conjunction with my data read-out device are applied to the inputs 20 and 21 in the two-channel system shown. Normally, the output of the data processing device includes a holding circuit which maintains each discrete time-spaced signal constant during the period it is available. The signal applied to each channel of the present apparatus is fed through an adjustable resistance 22, enabling an adjustment of the recording level. A biasing circuit is also applied to each channel, and an isolating impedance 23 blocks the influence, on the input, of the biasing current, which current may be supplied by a bias A.C. source 24. However, the bias current may be D.C. supplied by a D.C. source (not shown) if desired. The signal superimposed over the bias reaches the respective recording head 26 when the respective switch 25 is in the record position. The recording heads 26 are placed in juxtaposition to a magnetic drum 27 or to a magnetic tape placed upon a cylinder. While each consecutive discrete signal is applied to a recording head 26, the magnetic medium 27 is uniformly indexed forward by a predetermined constant distance, leaving a discrete length of each recording track magnetized to a degree and polarity proportional to the signal applied to the head.

The indexing mechanism comprises an index motor 28 which rotates the drum or cylinder 27 by means of gears 29 and axle 30. An index master switch 31, actuated by the index motor 28 through a cam 31a, simultaneously controls a set of control relays 32 activating or deactivating the index motor 28 and the controls of the data processing device providing the discrete signals fed into the inputs 20 and 21. For instance, if the device is an analog computer and the discrete signals are the results of a numerical computation giving the values of a quantity for various values of an independent variable, the controls of the data processing device would consist of the necessary steps required to change the value of the independent variable by an incremental amount and to perform the computation.

The consecutive discrete signals appearing at the output of the data processing device are therefore laid stepwise on each recording track as a series of magnetized intervals, as previously described in connection with Figure 4.

For reproducing these stored signals as a continuous signal, the magnetic medium is moved past a playback head for each channel. Each playback head may be either another head (not shown) placed at another position on the circumference of the cylinder, or the same head 26 which was used for the recording. The magnetic medium is moved past the playback heads in a continuous uniform manner and at a higher rate of speed than during the individual indexing steps. The movement of the recording medium is powered by the playback motor 33 through a gear system 34. The motor 33 is controlled by an on-off switch 33a, and, when the motor is energized, it rotates the cylinder 27 continuously at constant speed.

The index motor 28 and the playback motor 33 are placed so that only one of the two can be driving the axle 30 at a time through their respective gear systems 29 and 34. This is shown in Figure 5 by the mechanical linkage 35 connected to the motors 28 and 33 and centered at the point 36, whereby the two motors may be placed into the two positions "Record" and "Playback." Also, the linkage 35 may be connected to the switches 25, as indicated by the dotted line, to automatically move the switches to their proper positions for recording and playback.

The signal generated on each playback head is amplified in an equalized band pass amplifier 37 which flattens the response of the entire recording playback system in the frequency band of interest. The amplified signal is fed to a sharp cutoff low-pass filter 38 which smoothes out the square edges of the magnetized intervals, leaving only the fundamental shape of the signal constructed stepwise on the magnetic medium. Therefore, the discrete signals consecutively supplied by the data processing device are transposed to a continuously varying signal.

These playback signals may be recorded permanently or transiently on a galvanometer film recorder, pen recorder, oscilloscope or any other desired recorder 39. The data may also be, if desired, kept permanently stored in unsmoothed form on the magnetic medium.

While the playback signal appears as a function of time, time may represent any other variable, the incidence and linearity of which is controlled by controlling the sampling points recorded. These sampling points are determined by the frequency content, i.e., the rapidity of variations of the magnitude of the quantity being recorded. The well known sampling theorem gives the minimum number of equispaced sampling points required to determine uniquely a function known to contain no components of frequency higher than a certain limit frequency. It states that at least two points per cycle of this highest frequency are needed. From experience, I have found that a sampling covering three points in a cycle of the highest frequency in the band of interest gives enough safety margin to obtain smooth and reliable results.

Generally, but not necessarily, the signals are played back at a much more rapid rate than that at which the recording medium is indexed during the recording intervals. In such case, any alternating signal applied during the recording intervals will appear at much higher frequency when played back and will be eliminated by the low-pass filter. Where A.C. bias is used for recording, therefore, the bias frequency during the recording interval may be quite low with yet each magnetized step containing a large number of cycles of the bias frequency. It is generally practical, therefore, to use power line frequency as a bias supply, eliminating the need for a special bias oscillator. Moving the medium at indexing speed, this low frequency may also be used to erase.

From the foregoing, it is seen that I have provided an improved method of and apparatus for recording discrete values of a quantity which is a function of an independent variable wherein said discrete values of said quantity correspond to known values of said variable; my novel method being principally characterized by the fact that successive zones of the recording medium are magnetized uniformly and the zones are located in a predetermined relation to the value of the independent variable and successive zones are spaced at a distance less than the length of either of the zones adjacent thereto. In addition, I have provided an improved method of transposing a sequence of discrete time-spaced signals into a continuous time-varying signal.

It will be understood that various changes in details of construction and arrangement of parts and steps may be made by those skilled in the art without departing from the spirit of the invention as set forth in the appended claims.

I claim:

1. A method of recording discrete values of a quantity which is a function of a variable, wherein the discrete values of said quantity correspond to known values of said variable, comprising magnetizing successive zones of a recording medium which represent said discrete values, the degree of magnetization of each zone being uniform within itself and having a predetermined relation to the respective discrete value, spacing corresponding points of such zones at a predetermined relation with respect to said values of the variable, and spacing said successive zones at a distance therebetween less than one-half the length of either of the zones adjacent thereto.

2. A method of recording time spaced instantaneous values of a quantity which varies with time, comprising magnetizing successive zones of a recording medium which represent said instantaneous values, the degree of magnetization of each zone being uniform within itself and having a predetermined relation to the respective instantaneous value, spacing corresponding points of such zones at distances having a predetermined relation to the time intervals between the instantaneous values which such zones represent, and spacing said successive zones at distances therebetween less than one-half the length of either of the zones adjacent thereto.

3. A method as defined in claim 2 characterized further in that the distance between said successive zones is substantially zero.

4. In a method of transposing a series of time spaced signals to a continuous time varying signal, wherein the time spaced signals are recorded step-wise on a magnetic recording medium and are reproduced from the recording medium into a continuous time varying signal, the improvement which comprises recording each of said time spaced signals over a predetermined length of the recording medium, which, during reproduction, contributes energy to the continuous signal at a value having a known relation to the energy of the respective time spaced signal, and spacing said predetermined lengths at distances less than half of the length of one of said predetermined lengths.

5. A method of recording discrete values of a quantity which is a function of a variable, wherein the discrete values of said quantity correspond to known values of said variable, comprising magnetizing successive zones of a recording medium which represent said discrete values, the degree of magnetization of each zone being uniform within itself and having a predetermined relation to the respective discrete value, spacing corresponding points of such zones at a predetermined relation with respect to said values of the variable, spacing said successive zones at a distance therebetween less than one-half the length of either of the zones adjacent thereto and producing a continuous signal from said recording medium representative of the degrees of magnetization of said successive zones.

6. A method of recording time spaced instantaneous values of a quantity which varies with time, comprising magnetizing successive zones of a recording medium which represent said instantaneous values, the degree of magnetization of each zone being uniform within itself and having a predetermined relation to the respective instantaneous value, spacing corresponding points of such zones at distances having a predetermined relation to the time intervals between the instantaneous values which such zones represent, spacing said successive zones at distances therebetween less than one-half the length of either of the zones adjacent thereto and producing a continuous signal from said recording medium representative of the degrees of magnetization of said successive zones.

7. A method as defined in claim 6 characterized further in that the distance between successive zones is substantially zero.

8. A method as defined in claim 6 characterized further in that the continuous signal produced from said recording medium is smoothed.

9. A method as defined in claim 6 which further comprises smoothing said continuous signal and then recording the smoothed continuous signal as a continuous trace.

10. A method as defined in claim 9 characterized further in that the distance between said successive zones is substantially zero.

11. A method of transposing a series of time spaced electrical signals into a continuous electrical time varying signal by use of a magnetic recording medium, a recording head and a reproducing head, which comprises successively energizing the recording head with the series of time spaced signals, each energization of the recording head being maintained for a time duration such that the relative time representation of one of said signals resulting from said energization exceeds the corresponding time duration of said one of said time spaced signals and each energization being at a substantially uniform energy level throughout said time duration, which energy level has a predetermined relation to the energy level of the respective time spaced signal; moving the recording medium relative to the recording head a uniform distance during each energization of the recording head to provide a series of magnetized zones on the recording medium representative of the time spaced signals; and then moving the recording medium at a substantially uniform speed relative to the reproducing head for producing a continuous time varying signal representative of the degrees of magnetization of the successive zones of said series.

12. A method as defined in claim 11 characterized further in that the recording medium is moved relative to the recording head only when the recording head is being energized by one of the time spaced signals to substantially eliminate distances between said magnetized zones.

13. A reproducible magnetic record containing successive internally uniform zones of magnetization representative of discrete values of a quantity which is a function of a variable, such zones respectively having degrees of magnetization proportional to said discrete values, said zones being spaced such that corresponding points thereof have a predetermined spaced relation with respect to said values of said variable, said successive zones being spaced apart a distance therebetween less than one-half the length of either of the zones adjacent thereto.

14. A reproducible magnetic record as defined in claim 13 in which the distance between said successive zones is substantially zero.

References Cited in the file of this patent

UNITED STATES PATENTS

| | | |
|---|---|---|
| 2,416,090 | De Forest | Feb. 18, 1947 |
| 2,540,654 | Cohen et al. | Feb. 6, 1951 |